United States Patent
Lim et al.

(10) Patent No.: US 11,476,499 B2
(45) Date of Patent: Oct. 18, 2022

(54) ELECTROLYTE ADDITIVE AND ELECTROLYTE FOR LITHIUM SECONDARY BATTERY INCLUDING THE SAME

(71) Applicant: LG Chem, Ltd., Seoul (KR)

(72) Inventors: Young Min Lim, Daejeon (KR); Chul Haeng Lee, Daejeon (KR); Ha Eun Kim, Daejeon (KR)

(73) Assignee: LG Energy Solution, Ltd.

( * ) Notice: Subject to any disclaimer, the term of this patent is extended or adjusted under 35 U.S.C. 154(b) by 279 days.

(21) Appl. No.: 16/339,830

(22) PCT Filed: Mar. 16, 2018

(86) PCT No.: PCT/KR2018/003133
§ 371 (c)(1),
(2) Date: Apr. 5, 2019

(87) PCT Pub. No.: WO2018/169368
PCT Pub. Date: Sep. 20, 2018

(65) Prior Publication Data
US 2019/0296397 A1    Sep. 26, 2019

(30) Foreign Application Priority Data

Mar. 17, 2017  (KR) .................... 10-2017-0034037

(51) Int. Cl.
| | | |
|---|---|---|
| *H01M 50/44* | (2021.01) | |
| *H01M 10/0567* | (2010.01) | |
| *C07F 5/02* | (2006.01) | |
| *H01M 10/052* | (2010.01) | |
| *H01M 10/42* | (2006.01) | |
| *H01M 10/0525* | (2010.01) | |
| *H01M 10/0568* | (2010.01) | |
| *H01M 10/0569* | (2010.01) | |

(52) U.S. Cl.
CPC .......... *H01M 10/0567* (2013.01); *C07F 5/02* (2013.01); *C07F 5/022* (2013.01); *H01M 10/052* (2013.01); *H01M 10/0525* (2013.01); *H01M 10/0568* (2013.01); *H01M 10/0569* (2013.01); *H01M 10/42* (2013.01); *H01M 2300/0025* (2013.01); *Y02T 10/70* (2013.01)

(58) Field of Classification Search
CPC .......... H01M 10/0567; H01M 10/052; H01M 10/0525; H01M 10/0568; H01M 10/0569; H01M 10/42; H01M 2300/0025; Y02T 10/70
See application file for complete search history.

(56) References Cited

U.S. PATENT DOCUMENTS

| | | |
|---|---|---|
| 6,783,896 B2 | 8/2004 | Tsujioka et al. |
| 7,172,834 B1 | 2/2007 | Jow et al. |
| 8,846,247 B2 | 9/2014 | Shigematsu et al. |
| 9,666,906 B2 | 5/2017 | Ho et al. |
| 10,205,192 B2 | 2/2019 | Dubois et al. |
| 10,541,447 B2 | 1/2020 | Kim et al. |
| 2002/0081496 A1 | 6/2002 | Tsujioka et al. |
| 2008/0248397 A1 | 10/2008 | Jung et al. |
| 2010/0119951 A1 | 5/2010 | Abouimrane et al. |
| 2010/0313410 A1 | 12/2010 | Min et al. |
| 2014/0113202 A1 | 4/2014 | Sun et al. |
| 2014/0295288 A1 | 10/2014 | Ding |
| 2015/0093602 A1 | 4/2015 | Jung et al. |
| 2016/0226102 A1 | 8/2016 | Teran et al. |
| 2017/0309961 A1 | 10/2017 | Lim et al. |
| 2019/0245243 A1 | 8/2019 | Moloy et al. |

FOREIGN PATENT DOCUMENTS

| | | | |
|---|---|---|---|
| CN | 102522590 A | | 6/2012 |
| CN | 105119018 A | | 12/2015 |
| CN | 103682443 B | | 3/2016 |
| CN | 102709588 B | | 4/2016 |
| CN | 105552439 A | * | 5/2016 |
| CN | 106129456 A | | 11/2016 |
| DE | 112012004415 T5 | | 8/2014 |
| EP | 2437340 A1 | | 4/2012 |
| JP | 2010009940 A | | 1/2010 |
| KR | 20070012094 A | | 1/2007 |
| KR | 100736909 B1 | | 7/2007 |
| KR | 100814827 B1 | | 3/2008 |
| KR | 20090039211 A | | 4/2009 |
| KR | 20100016393 A | | 2/2010 |
| KR | 20130134237 A | | 12/2013 |
| KR | 20140024720 A | | 3/2014 |
| KR | 20140116720 A | | 10/2014 |
| KR | 20150014185 A | | 2/2015 |

(Continued)

OTHER PUBLICATIONS

International Search Report from PCT/KR2018/003133 dated Jun. 27, 2018.

(Continued)

*Primary Examiner* — Jimmy Vo

(74) *Attorney, Agent, or Firm* — Lerner, David, Littenberg, Krumholz & Mentlik, LLP

(57) ABSTRACT

An electrolyte additive composition of the present invention may improve high-rate charge and discharge characteristics and high-temperature storage and life characteristics of a lithium secondary battery when the electrolyte additive composition is used in an electrolyte while including a novel borate-based lithium compound as well as a nitrile-based compound.

9 Claims, No Drawings

(56) References Cited

FOREIGN PATENT DOCUMENTS

| KR | 101537848 B1 | 7/2015 |
| KR | 20160036812 A | 4/2016 |
| KR | 20170009873 A | 1/2017 |
| KR | 101702406 B1 | 2/2017 |
| WO | 2008100090 A1 | 8/2008 |
| WO | 2015179210 A1 | 11/2015 |

OTHER PUBLICATIONS

International Search Report from PCT/KR2018/003134 dated Jun. 27, 2018.
Extended European Search Report including Written Opinion for Application No. EP18768307.3 dated Jan. 15, 2020, pp. 1-14.
Abu-Lebdeh Y., et al., "High-voltage electrolytes based on adiponitrile for Li-ion batteries", Journal of The Electrochemical Society, vol. 156, No. 1, Nov. 2008, p. A60-A65, XP007907059.
Partial Supplementary European Search Report including Written Opinion for EP18768307.3 dated Nov. 4, 2019.
Supplemental European Search report including Written Opinion for EP18767604.4 dated Oct. 29, 2019.
Chinese Search Report for Application No. 201880004053.7 dated Jul. 21, 2021, pp. 1-3.

\* cited by examiner

ELECTROLYTE ADDITIVE AND ELECTROLYTE FOR LITHIUM SECONDARY BATTERY INCLUDING THE SAME

CROSS-REFERENCE TO RELATED APPLICATIONS

The present application is a national phase entry under 35 U.S.C. § 371 of International Application No. PCT/KR2018/003133 filed Mar. 16, 2018, which claims priority from Korean Patent Application No. 10-2017-0034037 filed Mar. 17, 2017, all of which are incorporated herein by reference.

TECHNICAL FIELD

Technical Field

The present invention relates to an electrolyte additive and a non-aqueous electrolyte for a lithium secondary battery including the same.

Background Art

As the miniaturization and weight reduction of electronic devices are realized and the use of portable electronic devices is common, research into secondary batteries having high energy density, as power sources of these devices, has been actively conducted.

The secondary battery includes a nickel-cadmium battery, a nickel-metal hydride battery, a nickel-hydrogen battery, and a lithium secondary battery, and, among these batteries, research into lithium secondary batteries, which not only exhibit a discharge voltage two times or more higher than a typical battery using an aqueous alkaline solution, but also have high energy density per unit weight and are rapidly chargeable, has been emerged.

A lithium metal oxide is used as a positive electrode active material of a lithium secondary battery, and lithium metal, a lithium alloy, crystalline or amorphous carbon, or a carbon composite is used as a negative electrode active material. A current collector is coated with the active material of appropriate thickness and length or the active material itself is coated in the form of a film, and the resultant product is then wound or stacked with an insulating separator to prepare electrodes. Thereafter, the electrodes are put into a can or a container similar thereto, and a secondary battery is then prepared by injecting an electrolyte.

Charge and discharge of the lithium secondary battery is performed while a process of intercalating and deintercalating lithium ions from a lithium metal oxide positive electrode into and out of a graphite negative electrode is repeated. In this case, since lithium is highly reactive, the lithium reacts with the carbon electrode to form $Li_2CO_3$, LiO, or LiOH, and thus, a film may be formed on the surface of the negative electrode. The film is referred to as "solid electrolyte interface (SEI)", wherein the SEI formed at an initial stage of charging may prevent a reaction of the lithium ions with the carbon negative electrode or other materials during charge and discharge. Also, the SEI only passes the lithium ions by acting as an ion tunnel. The ion tunnel may prevent the collapse of a structure of the carbon negative electrode due to the co-intercalation of the carbon negative electrode and organic solvents of the electrolyte having a high molecular weight which solvates the lithium ions and moves therewith.

Thus, in order to improve high-temperature cycle characteristics and low-temperature output of the lithium secondary battery, a robust SEI must be formed on the negative electrode of the lithium secondary battery. Once the SEI is formed during initial charge, the SEI may prevent the reaction of the lithium ions with the negative electrode or other materials during repeated charge and discharge caused by the subsequent use of the battery and may act as an ion tunnel that only passes the lithium ions between the electrolyte and the negative electrode.

Conventionally, with respect to an electrolyte which does not include an electrolyte additive or includes an electrolyte additive having poor characteristics, it was difficult to expect the improvement of low-temperature output characteristics due to the formation of a non-uniform SEI. Furthermore, even in a case in which the electrolyte additive is included, since the surface of the positive electrode is decomposed or the electrolyte causes an oxidation reaction during a high-temperature reaction due to the electrolyte additive when an amount of the electrolyte additive added may not be adjusted to the required amount, irreversible capacity of the secondary battery may ultimately be increased and output characteristics may be reduced.

Thus, there is a need to develop a compound which may be used as an electrolyte additive for improving overall performance, such as high-rate charge and discharge characteristics, high-temperature performance characteristics, and life characteristics, of the battery by forming a robust SEI on the negative electrode.

DISCLOSURE OF THE INVENTION

Technical Problem

An aspect of the present invention provides a novel electrolyte additive capable of improving high-rate charge and discharge characteristics, suppressing an amount of gas generated during high-temperature storage, and improving life characteristics, and an electrolyte additive composition which may improve the above-described performance of a lithium secondary battery by including the novel electrolyte additive as well as an additive capable of having a synergistic effect on performance improvement when used together.

Technical Solution

According to an aspect of the present invention, there is provided an electrolyte additive composition including a borate-based lithium compound represented by Formula 1; and a nitrile-based compound represented by Formula 2, wherein the electrolyte additive composition does not include a phosphate-based compound.

[Formula 1]

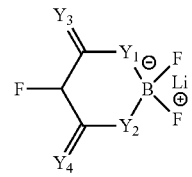

In Formula 1, $Y_1$ to $Y_4$ are each independently oxygen (O) or sulfur (S).

$$N\equiv C-R_1-C\equiv N \quad \text{[Formula 2]}$$

In Formula 2, $R_1$ is an alkylene group having 1 to 5 carbon atoms.

Advantageous Effects

An electrolyte additive composition of the present invention may improve high-rate charge and discharge characteristics of a lithium secondary battery, may suppress an amount of gas generated during high-temperature storage, and may improve life characteristics at high temperature operation due to a synergistic effect of a novel electrolyte additive and a nitrile-based compound mixed therewith.

MODE FOR CARRYING OUT THE INVENTION

Hereinafter, preferred embodiments of the present invention will be described in more detail. It will be understood that words or terms used in the specification and claims should be interpreted as having a meaning that is consistent with their meaning in the context of the relevant art and the technical idea of the invention, based on the principle that an inventor may properly define the meaning of the words or terms to best explain the invention.

Accordingly, since configurations illustrated in examples described in the specification are merely the most exemplary embodiments of the present invention and do not represent the entire technical idea of the present invention, it should be understood that there may be various equivalents and modifications capable of replacing them at the time of application.

Electrolyte Additive Composition

According to the present specification, a novel electrolyte additive composition is provided, and the electrolyte additive composition includes a borate-based lithium compound represented by Formula 1; and a nitrile-based compound represented by Formula 2, wherein the electrolyte additive composition does not include a phosphate-based compound.

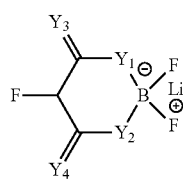

[Formula 1]

In Formula 1, $Y_1$ to $Y_4$ are each independently oxygen (O) or sulfur (S).

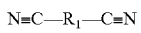

[Formula 2]

In Formula 2, $R_1$ is an alkylene group having 1 to 5 carbon atoms.

1) Borate-Based Lithium Compound

According to the present specification, a borate-based lithium compound represented by the following Formula 1 is included in the electrolyte additive composition.

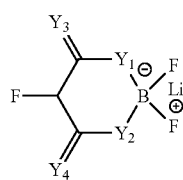

[Formula 1]

In Formula 1, $Y_1$ to $Y_4$ are each independently O or S. Preferably, $Y_1$ to $Y_4$ may be equally O.

The borate-based lithium compound may be included as an additive in an electrolyte, wherein the borate-based lithium compound forms uniform and thin films on a positive electrode and a negative electrode, and, particularly, the borate-based lithium compound may improve durability of a battery by mainly forming solid electrolyte interface (SEI) on a positive electrode to reduce a reaction between the positive electrode and other materials and thus forming a uniform and thin film. Also, the borate-based lithium compound may form a robust SEI on a surface of the negative electrode during the operation of the battery, and high-rate charge and discharge characteristics of the battery may be improved due to the interface robustly formed as described above.

As a specific example, the borate-based lithium compound as described above may include a compound represented by the following Formula 1a.

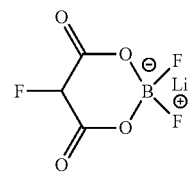

[Formula 1a]

The borate-based lithium compound may be appropriately used according to an amount of the electrolyte additive generally added to the electrolyte, and, for example, may be used in an amount of about 0.01 part by weight to about 2 parts by weight, preferably 0.01 part by weight to 0.5 part by weight or 0.1 part by weight to 2 parts by weight, and more preferably 0.5 part by weight to 1 part by weight based on 100 parts by weight of a total weight of the electrolyte. In a case in which the borate-based lithium compound is used in an amount within the above range, a robust SEI may be stably formed on the negative electrode as described above, and the resulting effect may be obtained.

2) Nitrile-Based Compound

According to the present specification, a nitrile-based compound is included in the electrolyte additive composition.

The nitrile-based compound is a compound represented by the following Formula 2.

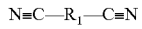

[Formula 2]

In Formula 2, $R_1$ is an alkylene group having 1 to 5 carbon atoms.

The nitrile-based compound is a compound containing two nitrile groups, wherein a linking group linking the two nitrile groups is an alkylene group and a carbon number may be in a range of 1 to 5, for example, 2 to 4.

The nitrile-based compound, in which the carbon number of the alkylene group, as a linking group, is in a range of 2 to 4, includes succinonitrile, glutaronitrile, or adiponitrile, and at least one of these compounds may be included as one component of the electrolyte additive composition. Among them, succinonitrile or adiponitrile may be preferably used.

The nitrile-based compound is a compound capable of providing a synergistic effect with the borate-based lithium compound as described above on the improvement in performance of the lithium secondary battery, wherein the nitrile-based compound, as an additive generally used in a non-aqueous electrolyte of a lithium secondary battery, may have an effect such as suppression of the dissolution of positive electrode transition metals, and, when it is used with the borate-based lithium compound, an effect, such as improvement of high-temperature characteristics, may be expected due to the stabilization of the positive electrode/negative electrode films.

That is, the nitrile-based compound may play a complementary role in forming the negative electrode SEI in addition to the effect induced by the borate-based lithium compound, may play a role in suppressing the decomposition of a solvent in the electrolyte, and may play a role in improving mobility of lithium ions.

In a case in which the nitrile-based compound is included in the electrolyte, the nitrile-based compound may be used in an amount of about 0.01 part by weight to about 10 parts by weight, preferably 0.01 part by weight to 5 parts by weight or 0.1 part by weight to 10 parts by weight, and more preferably 0.1 part by weight to 5 parts by weight based on 100 parts by weight of the total weight of the electrolyte.

As described above, the borate-based lithium compound represented by Formula 1 forms uniform and thin films on the positive electrode and the negative electrode, and particularly, the borate-based lithium compound improves durability of the battery by mainly forming the positive electrode solid electrolyte interface (SEI) to reduce the positive electrode reaction of other materials and thus forming a uniform and thin film.

Upon activation, the borate-based lithium compound may first form the SEI of a negative electrode inorganic component to improve conductivity of lithium cation and form a film having excellent durability, but it is difficult to obtain the above-described effect by using a single material. Thus, since an electrolyte additive composition is achieved by mixing the borate-based lithium compound represented by Formula 1 with the nitrile-based compound that may help to form the negative electrode film, the SEIs of the positive electrode and the negative electrode are stabilized to improve overall performance, such as high-rate charge and discharge characteristics, high-temperature storage characteristics, and life characteristics, of the lithium secondary battery.

Since the film is stably formed as described above, a side reaction, for example, the decomposition of the solvent in the electrolyte around the electrode, may be suppressed, and, accordingly, an amount of gas generated may be significantly reduced even if the battery is stored in a high-temperature environment. Life performance may also be improved due to the improvement in storage characteristics.

Furthermore, since the borate-based lithium compound may be stable without being decomposed at high temperature, there is no side reaction, for example, decomposition of the surface of the positive electrode or oxidation of the electrolyte. Thus, an increase in irreversible capacity of the battery may be prevented, and accordingly, an effect of increasing reversible capacity may be obtained.

3) Others

The electrolyte additive composition according to the present specification does not include a phosphate-based compound. Specifically, the phosphate-based compound may be a compound represented by Formula 3 below.

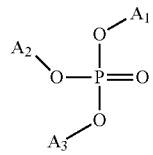

[Formula 3]

In Formula 3, $A_1$ to $A_3$ are each independently —Si($R_2$)$_n$ ($R_3$)$_{3-n}$, or a propynyl group (—C≡C), wherein $R_2$ and $R_3$ are each independently an alkyl group having 1 to 4 carbon atoms, and n is an integer of 0 to 3.

The phosphate-based compound, for example, may include tris(trimethylsilyl) phosphate, tris(triethylsilyl) phosphate, tris(tripropylsilyl) phosphate, bis(trimethylsilyl)(triethylsilyl) phosphate, bis(triethylsilyl)(trimethylsilyl) phosphate, bis(tripropylsilyl)(trimethylsilyl) phosphate, and bis(tridimethylsilyl)(tripropylsilyl) phosphate.

The phosphate-based compound as described above may have a significantly adverse effect on aging characteristics of the electrolyte itself, and there is a concern that it may interfere with the synergistic effect of the borate-based lithium compound and the nitrile-based compound in addition to the adverse effect on the aging characteristics. Thus, it is desirable not to include the phosphate-based compound in terms of improving high-temperature performance of the battery, and, particularly, it is desirable not to include tributyl phosphate or tris(trimethylsilyl) phosphate.

In the electrolyte additive composition according to the present specification, a weight ratio of the borate-based lithium compound to the nitrile-based compound may be in a range of 1:0.5 to 1:6, preferably 1:1 to 1:5, and more preferably 1:2 to 1:5.

In a case in which the ratio satisfies the above range, since a capacity retention at high temperature is improved and the amount of gas generated during high-temperature storage is suppressed, an improvement in high-temperature storage characteristics may be expected. That is, an electrolyte capable of satisfying both battery performance and storage characteristics at high temperature may be obtained by adjusting the weight ratio of the borate-based lithium compound to the nitrile-based compound, and obtainability may be higher as the ratio is within a preferred range among the above ranges.

Also, the electrolyte additive composition may further include a fluorocarbonate-based compound, and the fluorocarbonate-based compound, for example, may include fluoroethylene carbonate or difluoroethylene carbonate, and may particularly include fluoroethylene carbonate.

In a case in which the fluorocarbonate-based compound is included in the electrolyte, the fluorocarbonate-based compound may be used in an amount of about 0.01 part by weight to about 10 parts by weight, preferably 0.01 part by weight to 5 parts by weight or 0.1 part by weight to 10 parts by weight, and more preferably 0.1 part by weight to 5 parts by weight based on 100 parts by weight of the total weight of the electrolyte. The fluorocarbonate-based compound may be included in a weight ratio of 1:0.5 to 1:6, for example, 1:1 to 1:4 with respect to the borate-based lithium compound within the above amount range.

In a case in which the fluorocarbonate-based compound, particularly, fluoroethylene carbonate is included within the above range, it is advantageous in that an improvement in capacity retention at high temperature, that is, high-temperature performance characteristics may be additionally obtained.

4) Other Additives

The electrolyte additive composition according to the present specification may further include other additives in addition to the borate-based lithium compound represented by Formula 1, the nitrile-based compound represented by Formula 2, and the fluorocarbonate-based compound.

As the additives that may be further included, a carbonate-based compound, a borate-based compound, a sulfite-based compound, a sultone-based compound, a sulfone-based compound, or a fluorobenzene-based compound may be used, and, a mixture of two or more selected from these compounds may be used.

As the carbonate-based compound, vinylene carbonate or vinyl ethylene carbonate, for example, may be used, and the compound may be substituted with a substituent such as an alkyl group having 1 to 3 carbon atoms. Also, the fluorobenzene-based compound may be a benzene compound, which is substituted with fluorine instead of hydrogen, such as fluorobenzene, difluorobenzene, and trifluorobenzene.

The borate-based compound may be represented by Formula 4 below.

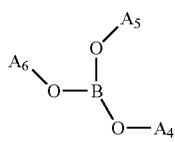

[Formula 4]

In Formula 4, $A_4$ to $A_6$ are each independently —$Si(R_2)_m(R_3)_{3-m}$, or a propynyl group (—C≡C), wherein $R_2$ and $R_3$ are each independently an alkyl group having 1 to 4 carbon atoms, and m is an integer of 0 to 3.

As the borate-based compound, for example, tris(trimethylsilyl) borate, tris(triethylsilyl) borate, tris(tripropylsilyl) borate, bis(trimethylsilyl)(triethylsilyl) borate, bis(triethylsilyl)(trimethylsilyl) borate, bis(tripropylsilyl)(trimethylsilyl) borate, and bis(tridimethylsilyl)(tripropylsilyl) borate may be used, and the compound, in which alkyl groups of each silyl group are different from each other, may be used.

Also, as the borate-based compound, dipropynyl ethyl borate or diethyl propynyl borate may be used.

Since the borate-based compound promotes ion-pair separation of a lithium salt, the borate-based compound may improve mobility of lithium ions, may reduce interfacial resistance of the SEI, and may dissociate a material, such as LiF, which may be formed during a battery reaction but is not well separated, and thus, a problem, such as generation of hydrofluoric acid gas, may be solved.

The sulfite-based compound, the sultone-based compound, and the sulfone-based compound may be represented by Formula 5 below.

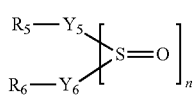

[Formula 5]

In Formula 5, $Y_5$ and $Y_6$ are each independently a direct bond, carbon (C), or O, $R_5$ and $R_6$ are each independently a substituted or unsubstituted alkyl group having 1 to 10 carbon atoms, a substituted or unsubstituted aryl group having 6 to 20 carbon atoms, or are linked together to form 4- to 7-membered rings, and n is 1 or 2.

In Formula 5, if n is 1, the number of S=O bonds is 1, $R_5$ and $R_6$ are linked together to form a ring, and simultaneously, when $Y_5$ and $Y_6$ are O, the compound may be a sulfite-based sulfur-containing compound. If n is 2, the number of S=O bonds is 2, $R_5$ and $R_6$ are linked together to form a ring, and simultaneously, when any one of $Y_5$ and $Y_6$ is carbon and the other is oxygen, the compound may be a sultone-based sulfur-containing compound. Also, if n is 2, the number of S=O bonds is 2 and, when $R_5$ and $R_6$ do not form a ring, the compound may be a sulfone-based compound.

As a specific example, methylene sulfite, ethylene sulfite, trimethylene sulfite, tetramethylene sulfite, or a sulfite having a substituent bonded to these alkylene groups may be used as the sulfite-based sulfur-containing compound.

Also, as the sulfone-based sulfur-containing compound, dialkyl sulfone to which an alkyl group having 1 to 5 carbon atoms is bonded, diaryl sulfone to which an aryl group having 6 to 12 carbon atoms is bonded, or sulfone having a substituent bonded to the dialkyl or diaryl may be used. And, as the sultone-based sulfur-containing compound, 1,3-propane sultone, 1,3-propene sultone, 1,4-butane sultone, 1,5-pentane sultone, or sultone having a substituent bonded to these alkylene groups may be used.

The sulfite-based, sultone-based, and sulfone-based compounds may generally play a role in complementing the formation of the SEI on the surface of the negative electrode, and the sulfite-based, sultone-based, and sulfone-based compounds may have an effect on high-temperature storage performance and high-rate charge and discharge characteristics by contributing the formation of stable SEI similar to the above-described borate-based lithium compound.

Electrolyte for Lithium Secondary Battery

According to the present specification, an electrolyte for a lithium secondary battery including the above-described electrolyte additive composition; a lithium salt; and a non-aqueous organic solvent is provided.

Since descriptions of the electrolyte additive composition overlap with those described above, the descriptions thereof will be omitted.

However, with regard to the amount of the electrolyte additive composition, the electrolyte additive composition may be included in an amount of 0.1 wt % to 15 wt %, preferably 0.5 wt % to 10 wt %, and more preferably 1.0 wt % to 7.0 wt % based on the total weight of the electrolyte.

That is, in order for the nitrile-based compound to complement the borate-based lithium compound and have a synergistic effect, each compound may be included in an amount of at least 0.1 wt % or more, and, in a case in which each compound is included in an amount of greater 15 wt %, since amounts of the organic solvent and the lithium salt may be relatively reduced, it may degrade basic performance of the battery beyond the role of the additive. Thus, it is necessary to appropriately adjust the amount within a range of 0.1 wt % to 15 wt %, if possible.

In the electrolyte according to the present specification, the non-aqueous organic solvent may include any kind of organic solvent which may be used as a non-aqueous electrolyte during the preparation of a typical lithium secondary battery. In this case, the amount thereof may be appropriately changed within a normally usable range.

Specifically, the non-aqueous organic solvent may include conventional organic solvents, which may be used as a non-aqueous organic solvent of a lithium secondary battery, such as a cyclic carbonate solvent, a linear carbonate solvent, an ester solvent, or a ketone solvent, and one alone or a mixture of two or more thereof may be used.

The cyclic carbonate solvent may include one selected from the group consisting of ethylene carbonate (EC), vinylene carbonate (VC), fluoroethylene carbonate (FEC), propylene carbonate (PC), and butylene carbonate (BC), or a mixed solution of two or more thereof.

Also, the linear carbonate solvent may include one selected from the group consisting of dimethyl carbonate (DMC), diethyl carbonate (DEC), dipropyl carbonate (DPC), ethylmethyl carbonate (EMC), methylpropyl carbonate (MPC), and ethylpropyl carbonate (EPC), or a mixed solution of two or more thereof.

Furthermore, the ester solvent may include one selected from the group consisting of methyl acetate, ethyl acetate, propyl acetate, methyl propionate, ethyl propionate, γ-butyrolactone, γ-valerolactone, γ-caprolactone, δ-valerolactone, and ε-caprolactone, or a mixed solution of two or more thereof. Also, poly(methyl vinyl ketone) may be used as the ketone solvent.

In addition, a mixed organic solvent, in which 3 kinds of carbonate-based solvents are mixed, may be used as the non-aqueous organic solvent, and, it is more desirable to use a ternary non-aqueous organic solvent. Examples of the compound, which may be used in the mixing, may be ethylene carbonate, propylene carbonate, butylene carbonate, dimethyl carbonate, diethyl carbonate, dipropyl carbonate, ethylmethyl carbonate, vinylene carbonate, fluoroethylene carbonate, methylpropyl carbonate, or ethylpropyl carbonate, and a mixed solvent, in which 3 kinds selected from the above carbonate compounds are mixed, may be used.

Any lithium salt may be used without limitation as the lithium salt, which may be included in the electrolyte, as long as it may provide predetermined lithium ion conductivity and is typically used in an electrolyte for a lithium secondary battery, and, for example, at least one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $F_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used as an anion of the lithium salt.

Lithium Secondary Battery

According to the present specification, a lithium secondary battery including the above-described electrolyte for a lithium secondary battery may be provided, and the lithium secondary battery includes a positive electrode including a positive electrode active material, a negative electrode including a negative electrode active material, a separator disposed between the positive electrode and the negative electrode, and the above-described electrolyte.

The lithium secondary battery of the present invention may be prepared according to a typical method known in the art. For example, an electrolyte assembly is formed by sequentially stacking the positive electrode, the negative electrode, and the separator disposed between the positive electrode and the negative electrode, and the lithium secondary battery may be prepared by injecting an electrolyte in which a lithium salt is dissolved.

The positive electrode may be prepared by a typical method known in the art. For example, a binder, a conductive agent, and a dispersant, if necessary, as well as a solvent are mixed with a positive electrode active material and stirred to prepare a slurry. The positive electrode may be prepared by coating a slurry on the metal current collector, pressing and then drying.

The positive electrode is prepared by a process of coating the positive electrode collector with the positive electrode active material and then drying the coated positive electrode collector. In this case, a lithium-containing transition metal oxide is preferably used as the positive electrode active material, and, for example, any one selected from the group consisting of $Li_xCoO_2$ (0.5<x<1.3), $Li_xNiO_2$ (0.5<x<1.3), $Li_xMnO_2$ (0.5<x<1.3), $Li_xMn_2O_4$ (0.5<x<1.3), $Li_x(Ni_aCo_bMn_c)O_2$ (0.5<x<1.3, 0<a<1, 0<b<1, 0<c<1, a+b+c=1), $Li_xNi_{1-y}Co_yO_2$ (0.5<x<1.3, 0<y<1), $Li_xCo_{1-y}Mn_yO_2$ (0.5<x<1.3, 0≤y<1), $Li_xNi_{1-y}Mn_yO_2$ (0.5<x<1.3, 0≤y<1), $Li_x(Ni_aCo_bMn_c)O_4$ (0.5<x<1.3, 0<a<2, 0<b<2, 0<c<2, a+b+c=2), $Li_xMn_{2-z}Ni_zO_4$ (0.5<x<1.3, 0<z<2), $Li_xMn_{2-z}Co_zO_4$ (0.5<x<1.3, 0<z<2), $Li_xCoPO_4$ (0.5<x<1.3), and $Li_xFePO_4$ (0.5<x<1.3), or a mixture of two or more thereof may be used. Also, an active material having a high content of a specific transition metal, such as $xLi_2MO_3(1-x)LiMeO_2$ (where M is nickel (Ni), cobalt (Co), or manganese (Mn), Me is two or more transition metals selected from the group consisting of Ni, Co, Mn, chromium (Cr), iron (Fe), vanadium (V), aluminum (Al), magnesium (Mg), and titanium (Ti), and x satisfies 0<x<1), may be used.

The lithium-containing transition metal oxide may be coated with a metal, such as aluminum (Al), or a metal oxide. Also, in addition to the lithium-containing transition metal oxide, a sulfide, a selenide, or a halide may be used.

The positive electrode collector is generally formed to a thickness of 3 μm to 500 μm. The positive electrode collector is not particularly limited so long as it has conductivity without causing adverse chemical changes in the battery, and any metal may be used as long as it, as a metal with high conductivity as well as a metal to which the slurry of the positive electrode active material may be easily adhered, is not reactive in a voltage range of the battery. Non-limiting examples of the positive electrode collector may be aluminum, nickel, or a foil prepared by combination thereof.

The solvent used for forming the positive electrode may include an organic solvent, such as N-methylpyrrolidone (NMP), dimethylformamide (DMF), acetone, and dimethylacetamide, or water, and these solvents may be used alone or in a mixture of two or more thereof.

An amount of the solvent used may be sufficient if the solvent may dissolve and disperse the electrode active material, the binder, and the conductive agent in consideration of a coating thickness of the slurry and manufacturing yield.

The conductive agent may be used without limitation as long as it may be generally used in the art, and, for example, artificial graphite, natural graphite, carbon black, acetylene black, Ketjen black, Denka black, thermal black, channel black, carbon fibers, metal fibers, aluminum, tin, bismuth, silicon, antimony, nickel, copper, titanium, vanadium, chromium, manganese, iron, cobalt, zinc, molybdenum, tungsten, silver, gold, lanthanum, ruthenium, platinum, iridium, titanium oxide, polyaniline, polythiophene, polyacetylene, polypyrrole, or a mixture thereof may be used.

The binder may be used without limitation as long as it is generally used in the art, and, for example, polyvinylidene fluoride (PVDF), a polyvinylidene fluoride-hexafluoropropylene copolymer (PVDF/HFP), poly(vinyl acetate), polyvinyl alcohol, polyethylene oxide, polyvinylpyrrolidone, polyvinylpyridine, alkylated polyethylene oxide, polyvinyl ether, poly(methyl methacrylate), poly(ethyl acrylate), polytetrafluoroethylene (PTFE), polyvinyl chloride, polyacrylonitrile, a styrene-butadiene rubber, an acrylonitrile-butadiene rubber, a fluoro rubber, an ethylene-propylene-diene monomer (EPDM), a sulfonated ethylene-propylene-diene monomer, carboxymethylcellulose (CMC), regenerated cellulose, starch, hydroxypropylcellulose, tetrafluoroethylene, or a mixture thereof may be used.

In the positive electrode, a filler may be further added to the mixture, if necessary. The filler, as a component that suppresses the expansion of the positive electrode, is selectively used, wherein the filler is not particularly limited as long as it is fibrous material while not causing chemical changes in the battery, and, for example, an olefin-based polymer such as polyethylene and polypropylene; and a fibrous material, such as glass fibers and carbon fibers, are used.

The negative electrode may be prepared by a typical method known in the art. For example, a binder, a conductive agent, and a dispersant, if necessary, as well as a solvent are mixed with a negative electrode active material and stirred to prepare a slurry, a metal current collector is then coated with the slurry and pressed, and the negative electrode may then be prepared by drying the coated metal current collector.

As the negative electrode active material, amorphous carbon or crystalline carbon may be included, and, specifically, carbon such as non-graphitizable carbon and graphite-based carbon; a complex metal oxide such as $Li_xFe_2O_3$ ($0 \le x \le 1$), $Li_xWO_2$ ($0 \le x \le 1$), $Sn_xMe_{1-x}Me'_yO_z$ (Me: manganese (Mn), iron (Fe), lead (Pb), or germanium (Ge); Me': aluminum (Al), boron (B), phosphorus (P), silicon (Si), Groups I, II and III elements of the periodic table, or halogen; $0 < x \le 1$; $1 \le y \le 3$; $1 \le z \le 8$); a lithium metal; a lithium alloy; a silicon-based alloy; a tin-based alloy; a metal oxide such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; a conductive polymer such as polyacetylene; or a Li—Co—Ni-based material or a Li—Ti—O-based material may be used.

Those used in the positive electrode may be equally used as the binder and the conductive agent included in the negative electrode.

The negative electrode collector is generally formed to a thickness of 3 μm to 500 μm. The negative electrode collector is not particularly limited so long as it has conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

Both of a polyolefin-based polymer typically used in the art and a composite separator having an organic-inorganic composite layer formed on an olefin-based substrate may be used as the separator disposing between the positive electrode and the negative electrode and insulating these electrodes, but the separator is not particularly limited thereto.

The positive electrode, negative electrode, and separator, which have the above-described structure, are accommodated in a pouch case, and a pouch type battery may then be prepared by injecting the non-aqueous electrolyte, but the present invention is not limited thereto. A shape of the lithium secondary battery according to the present specification is not particularly limited, but a cylindrical type using a can or a prismatic type may be used, and a coin type may be used.

Application Products

A battery module according to another embodiment of the present invention includes the above-described lithium secondary battery as a unit cell, and a battery pack according to another embodiment of the present invention includes the battery module.

The lithium secondary battery according to the present invention may not only be used in a battery module that is used as a power source of a small device, but may also be used as a unit cell in a medium and large sized battery pack including a plurality of batteries. However, since oxidation stability is excellent, the lithium secondary battery according to the present invention may be preferably used as a high-voltage power source of a small device, and may be a more suitable electrolyte system rather than being used as a power source of a medium and large sized device.

EXAMPLES

Hereinafter, the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

Examples 1 to 6

The borate-based lithium compound represented by the following Formula 1a and succinonitrile were mixed such that the borate-based lithium compound and the succinonitrile were respectively included in amounts of 1.0 wt % based on a total electrolyte, and an electrolyte additive composition, in which the borate-based lithium compound and the succinonitrile were mixed in a weight ratio of 1:1, was prepared in Example 1. The borate-based lithium compound and succinonitrile were mixed in weight ratios as listed in Table 1 to prepare electrolyte additive compositions of Examples 2 to 6.

[Formula 1a]

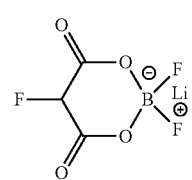

Examples 7 and 8

Electrolyte additive compositions of Examples 7 and 8 were respectively prepared by further mixing fluoroethylene carbonate in Example 4 in weight ratios as listed in Table 1.

Comparative Examples 1 to 7

Electrolyte additive compositions of Comparative Examples 1 to 7 were prepared by adjusting types and amounts of additives as listed in Table 1 below.

TABLE 1

| | Additive amount[1] | | | | | Additive | |
|---|---|---|---|---|---|---|---|
| | Formula 1a | SN[2] | FEC[3] | TBP[4] | TMSP[5] | weight ratio[6] | Total amount[1] |
| Example 1 | 1.0 | 0.5 | | | | 1:0.5 | 1.5 |
| Example 2 | 1.0 | 1.0 | | | | 1:1 | 2 |
| Example 3 | 1.0 | 2.0 | | | | 1:2 | 3 |
| Example 4 | 1.0 | 3.0 | | | | 1:3 | 4 |
| Example 5 | 1.0 | 5.0 | | | | 1:5 | 6 |
| Example 6 | 1.0 | 6.0 | | | | 1:6 | 7 |
| Example 7 | 1.0 | 3.0 | 1.0 | | | 1:3:1 | 4 |
| Example 8 | 1.0 | 3.0 | 2.0 | | | 1:3:2 | 6 |
| Comparative Example 1 | 1.0 | | | 0.5 | | 1:0.5 | 1.5 |
| Comparative Example 2 | 1.0 | | | | 0.5 | 1:0.5 | 1.5 |
| Comparative Example 3 | 1.0 | | 3.0 | 0.5 | | 1:3:0.5 | 4.5 |
| Comparative Example 4 | 1.0 | | 3.0 | | 0.5 | 1:3:0.5 | 4.5 |
| Comparative Example 5 | 3.0 | | | | | — | 3.0 |
| Comparative Example 6 | | 1.0 | 2.0 | | | — | 3.0 |
| Comparative Example 7 | | 1.0 | 0.5 | | | — | 1.5 |

[1] weight % based on a total weight of the electrolyte
[2] SN: succinonitrile
[3] FEC: fluoroethylene carbonate
[4] TBP: tributyl phosphate
[5] TMSP: tris(trimethylsilyl) phosphate
[6] weight ratios of additives based on the borate-based lithium compound of Formula 1a

Experimental Example

Performance Evaluation of Lithium Secondary Battery (1) Preparation of Electrolyte 1 mole/l of $LiPF_6$ was added to a non-aqueous organic solvent having a composition, in which propylene carbonate (PC):ethyl propionate (EP):dimethyl carbonate (DMC)=2:4:4 (weight ratio), based on a total amount of a non-aqueous electrolyte solution, and the electrolyte additive compositions of Examples 1 to 8 and Comparative Examples of 1 to 7 were added in amounts as listed in Table 1 to prepare electrolytes.

(2) Preparation of Lithium Secondary Battery 89 wt % of a mixture of $Li(Ni_{0.33}Co_{0.33}Mn_{0.33})O_2$ as a positive electrode active material, 8 wt % of carbon black as a conductive agent, and 3 wt % of polyvinylidene fluoride (PVDF), as a binder, were added to N-methyl-2-pyrrolidone (NMP), as a solvent, to prepare a positive electrode mixture slurry. An about 20 μm thick aluminum (Al) thin film, as a positive electrode collector, was coated with the positive electrode mixture slurry, dried, and then roll-pressed to prepare a positive electrode.

Also, 97 wt % of carbon powder as a negative electrode active material, 2 wt % of PVDF as a binder, and 1 wt % of carbon black, as a conductive agent, were added to NMP, as a solvent, to prepare a negative electrode mixture slurry. A 10 μm thick copper (Cu) thin film, as a negative electrode collector, was coated with the negative electrode mixture slurry, dried, and then roll-pressed to prepare a negative electrode.

After an electrode assembly was prepared by a typical method by stacking a polyolefin separator with the positive electrode and negative electrode thus prepared, and the electrolyte prepared in '(1)' was injected to complete the preparation of a lithium secondary battery.

Performance evaluation on the following items was performed on the lithium secondary batteries in which the electrolytes of Examples 1 to 8 and Comparative Examples of 1 to 7 were included as described above.

(3) Evaluation Items

1) High-Temperature Life Characteristics Evaluation

The lithium secondary batteries, in which the electrolyte additive compositions of Examples 1 to 8 and Comparative Examples 1 to 7 were used, were charged at 1.0 C/4.45 V to 4.45 V/112 mA under a constant current/constant voltage (CC/CV) condition at 45° C. and discharged at 1.0 C to a voltage of 3.0 V. This charge and discharge cycle was repeated 400 times and a capacity retention was calculated using Equation 1 below.

$$\text{Capacity retention (\%)} = (\text{discharge capacity after 400 cycles/initial discharge capacity}) \times 100 \quad [\text{Equation 1}]$$

2) High-Temperature Storage Characteristics Evaluation (a) Capacity Retention (%)

The lithium secondary batteries, in which the electrolyte additive compositions of Examples 1 to 8 and Comparative Examples 1 to 7 were used, were charged at 0.2 C/4.45 V to 4.45 V/112 mA under a constant current/constant voltage (CC/CV) condition at room temperature and discharged at 0.2 C to a voltage of 3.0 V to measure initial discharge capacity.

Thereafter, the secondary batteries were charged at 0.2 C/4.45 V to 4.45 V/112 mA under a constant current/constant voltage (CC/CV) condition at room temperature and then stored at 60° C. for 21 days. After the storage, the secondary batteries were charged at 0.2 C/4.45 V to 4.45 V/112 mA under a constant current/constant voltage (CC/CV) condition at room temperature and discharged at 0.2 C to a voltage of 3.0 V to measure discharge capacity after storage. a capacity retention was calculated using Equation 2 below.

$$\text{Capacity retention (\%)} = \text{discharge capacity after 21 days storage (mAh)/initial discharge capacity (mAh)} \quad [\text{Equation 2}]$$

(b) Thickness Increase Rate

After the initial charge and discharge in experiment (a), each battery was set to a state of charge (SOC) of 50% to measure a thickness, and the thickness was defined as an initial thickness. A battery thickness, which was measured at 60° C. after high-temperature storage at a SOC of 100%, was defined as a final thickness, and a thickness increase rate (%) of the battery was calculated using the following Equation 3.

$$\text{Thickness increase rate (\%)} = (\text{final thickness initial thickness/initial thickness}) \times 100 (\%) \quad [\text{Equation 3}]$$

(4) Evaluation Results

Performances of the lithium secondary batteries, in which the electrolyte additive compositions of Examples 1 to 8 and Comparative Examples 1 to 7 were used, were evaluated according to the above evaluation items, and the results thereof are presented in Table 2 below.

TABLE 2

| | Capacity retention (%) 45° C., 400 cycle | Capacity retention (%) 60° C., 21 days | Thickness increase rate (%) 60° C., 21 days |
|---|---|---|---|
| Example 1 | 79.4 | 76.3 | 15.2 |
| Example 2 | 82.5 | 88.5 | 12.1 |
| Example 3 | 84.7 | 90.7 | 11.2 |
| Example 4 | 85.2 | 91.4 | 10.7 |
| Example 5 | 83.4 | 85.9 | 10.3 |
| Example 6 | 86.8 | 87.6 | 11.8 |
| Example 7 | 88.0 | 86.4 | 12.6 |
| Example 8 | 76.2 | 80.5 | 10.4 |
| Comparative Example 1 | 70.1 | 63.2 | 25.8 |
| Comparative Example 2 | 69.6 | — | Vent[1) |
| Comparative Example 3 | 74.8 | 68.9 | 19.9 |
| Comparative Example 4 | 75.8 | 57.3 | 30.7 |
| Comparative Example 5 | 62.5 | 75.1 | 10.2 |
| Comparative Example 6 | 79.1 | — | Vent[1) |
| Comparative Example 7 | 72.5 | 59.8 | 33.1 |

[1)vent: a state in which evaluation was not possible because an increase in thickness of the battery was severe due to the generation of excessive amount of gas Referring to Table 2, it may be confirmed that Examples 1 to 8, in which the borate-based lithium compound and the nitrile-based compound (succinonitrile) were mixed in a ratio of 1:0.5 to 1:6, were evaluated as excellent in terms of both high-temperature life characteristics and high-temperature storage characteristics in comparison to Comparative Examples 1 to 7 in which the nitrile-based compound was not used or the phosphate-based compounds were further used.

Specifically, with respect to Comparative Examples 1 and 2 in which the nitrile-based compound was not used, but the phosphate-based compounds were respectively used with the borate-based lithium compound of Formula 1a, it may be confirmed that both life characteristics and storage characteristics at high temperature were quite poor, and, particularly, with respect to Comparative Example 2, it may be confirmed that the battery was malfunctioned because the amount of gas generated was excessive.

Also, capacity retentions of Comparative Examples 3 and 4, in which the nitrile-based compound was used, but the phosphate-based compounds were respectively further used, were relatively better than those of Comparative Examples 1 and 2, but these capacity retentions were also significantly lower than those of Examples, and, particularly, since capacity retention and thickness increase rates were poor, it may be confirmed that high-temperature storage characteristics were poor. From these results, it was confirmed that the phosphate-based compounds were not suitable as an electrolyte additive.

In addition, with respect to Comparative Example 5, in which the compound of Formula 1a was only used, and Comparative Examples 6 and 7 in which the compound of Formula 1a was not used, since cycle performances at high temperature were poor or amounts of gas generated during high-temperature storage were excessive, it may be confirmed that the batteries were vented or increases in thickness were severe.

Furthermore, with respect to Examples 1 to 8 according to the present specification, their effects were obtained by using the borate-based lithium compound of Formula 1a and the nitrile-based compound in a ratio of 1:0.5 to 1:6 based on the above data, but it may be confirmed that it was more desirable when the borate-based lithium compound of Formula 1a and the nitrile-based compound were used in a ratio of 1:1 to 1:5, and it was confirmed that, in a case in which the fluoroethylene carbonate was further used, the high-temperature life characteristics and the high-temperature storage characteristics may be further improved.

The invention claimed is:

1. A lithium secondary battery comprising a positive electrode, a negative electrode, a separator disposed between the positive electrode and the negative electrode, and an electrolyte, wherein the electrolyte comprises a lithium salt, a non-aqueous organic solvent, and an electrolyte additive composition comprising:

a borate-based lithium compound represented by Formula 1a:

[Formula 1a]

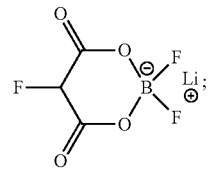

and a nitrile-based compound, wherein a weight ratio of the borate-based lithium compound to the nitrile-based compound is in a range of 1:2 to 1:3, wherein the nitrile-based compound is succinonitrile, and wherein the electrolyte additive composition does not comprise a phosphate-based compound.

2. The lithium secondary battery of claim 1, wherein the electrolyte additive composition further comprises fluoroethylene carbonate.

3. The lithium secondary battery of claim 1, wherein the electrolyte additive composition is included in an amount of 0.1 wt % to 15 wt % based on a total weight of the electrolyte.

4. The lithium secondary battery of claim 1, wherein the borate-based lithium compound is included in an amount of about 0.01 part by weight to about 2 parts by weight based on 100 parts by weight of a total weight of the electrolyte.

5. The lithium secondary battery of claim 1, wherein the nitrile-based compound is included in an amount of about 0.01 part by weight to about 10 parts by weight based on 100 parts by weight of a total weight of the electrolyte.

6. The lithium secondary battery of claim 2, wherein the fluoroethylene carbonate is included in an amount of about 0.01 part by weight to about 10 parts by weight based on 100 parts by weight of the total weight of the electrolyte.

7. The lithium secondary battery of claim 1, wherein the electrolyte additive composition further comprises at least one additive selected from the group consisting of a carbonate-based compound, a borate-based compound, a sulfite-based compound, a sultone-based compound, a sulfone-based compound, and a fluorobenzene-based compound.

8. The lithium secondary battery of claim 1, wherein the non-aqueous organic solvent comprises at least one selected from the group consisting of a cyclic carbonate solvent, a linear carbonate solvent, an ester solvent, and a ketone solvent.

9. The lithium secondary battery of claim 1, wherein the lithium salt comprises at least one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $F_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ as an anion.

* * * * *